United States Patent [19]
Shikichi

[11] Patent Number: 5,199,016
[45] Date of Patent: Mar. 30, 1993

[54] METHOD AND APPARATUS FOR PROCESSING DATA

[75] Inventor: Satoshi Shikichi, Tokyo, Japan

[73] Assignee: Canon Kabushiki Kaisha, Tokyo, Japan

[21] Appl. No.: 755,451

[22] Filed: Sep. 5, 1991

[30] Foreign Application Priority Data

Sep. 5, 1990 [JP] Japan .................. 2-233166

[51] Int. Cl.[5] .............................................. G11B 7/085
[52] U.S. Cl. ............................. 369/44.28; 369/44.29; 369/54; 235/454; 235/476
[58] Field of Search ................... 369/32, 44.25, 44.26, 369/44.28, 44.29, 44.31, 44.32, 44.35, 44.37, 47, 54; 235/454, 456, 476

[56] References Cited

U.S. PATENT DOCUMENTS

| 4,870,633 | 9/1989 | Matsushita et al. | 369/47 |
|---|---|---|---|
| 4,870,634 | 9/1989 | Sakagami | 369/47 |
| 4,982,391 | 1/1991 | Sakagami et al. | 369/47 X |
| 5,010,534 | 4/1991 | Enari et al. | 369/44.26 X |
| 5,038,332 | 8/1991 | Sakagami et al. | 369/44.26 |
| 5,083,301 | 1/1992 | Matoba et al. | 369/47 X |

Primary Examiner—Wayne R. Young
Attorney, Agent, or Firm—Fitzpatrick, Cella, Harper & Scinto

[57] ABSTRACT

A data processing apparatus includes a light source and an objective lens for radiating first and second light beams on a recording medium having a plurality of data and trucking tracks alternately formed and parallel to each other, photodetectors for detecting the tracking error signal from a beam obtained by reflection of the second light beam by the medium, a switching circuit for selectively supplying the tracking error signal to an actuator, a circuit for supplying a moving signal to the actuator to move the first and second light beams, respectively, to a data track different from one data track and a tracking different from one tracking track, and a control unit for monitoring the tracking error signal, for switching the switching circuit to supply the tracking error signal to the actuator in a tracking mode in which a data track is traced with the first light beam, and for switching the switching circuit not to supply the tracking error signal to the actuator in a moving mode for moving the first light beam to a different data track, the control unit interrupting monitoring of the tracking error signal during a period for which the second light beam is passing data tracks in the moving mode.

12 Claims, 6 Drawing Sheets

FIG. 8

# METHOD AND APPARATUS FOR PROCESSING DATA

BACKGROUND OF THE INVENTION

1. Field of the Invention

The present invention relates to a method and apparatus for processing data, wherein a data track of an optical recording medium is scanned with a light beam to perform at least one of data recording on the medium and data reproduction from the medium.

2. Related Background Art

Various types of recording media such as disk-like recording media, card-like recording media, and tape-like recording media are known as conventional data recording media for recording data and reading out the recorded data using light. These optical data recording media are classified into read/write media and "read-only" media. Data is recorded on a recordable medium by scanning a data track with a light beam modulated with recording data and focused into a small beam spot. Data is recorded as an optically detectable data pit array.

Data is reproduced from a recording medium as follows. A data pit array of a data track is scanned with a light beam spot having a power which does not allow recording of the recording medium, and a beam reflected by or transmitted through the recording medium is detected to perform data reproduction. A so-called optical head is used to radiate the light beam spot onto the recording medium and to detect the beam reflected by or transmitted through the recording medium. The optical head can be moved relative to the recording medium along the direction in which the data tracks of the recording medium extend and a direction perpendicular to the direction in which the data tracks extend. This relative movement allows scanning of the data track with the light beam spot. Of all the optical data recording media, a card-like optical data recording medium (i.e., an optical card) is the most promising medium as a data recording medium having a relatively large capacity due to its compactness and portability.

Figure 1:
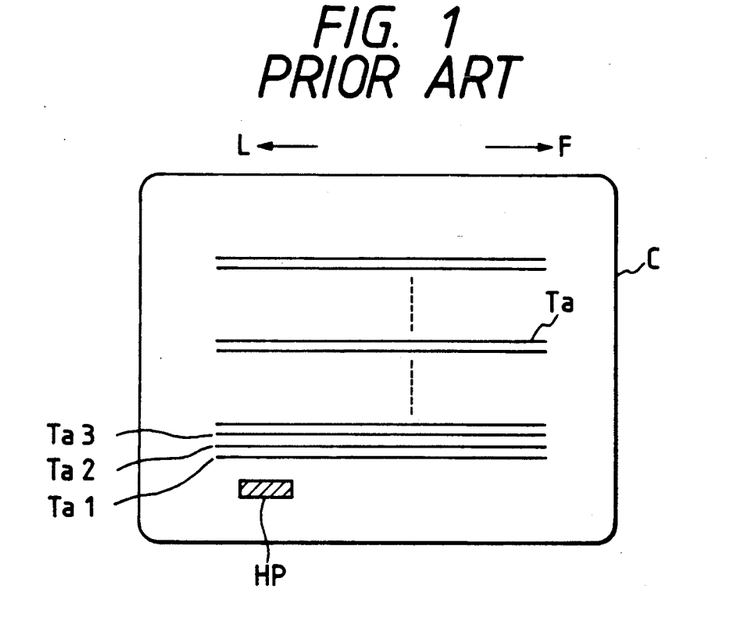
FIG. 1 is a schematic plan view showing a card-like recording medium used in the present invention.
Figure 2:
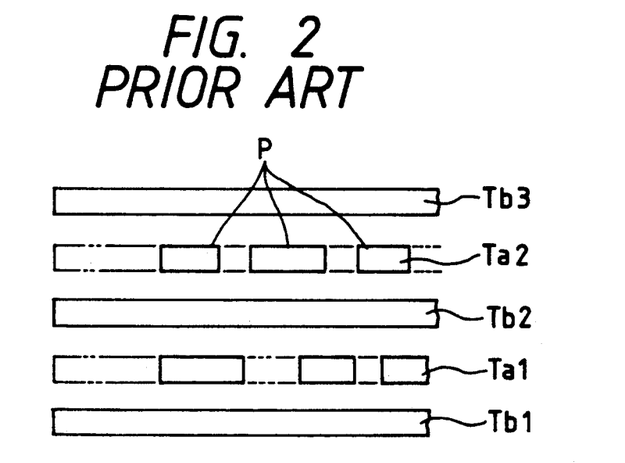
FIG. 2 is an enlarged view showing part of the medium shown in FIG. 1.

FIG. 1 is a schematic plan view of a WORM (write one read many type) optical card, and FIG. 2 is an enlarged view of a track portion of the optical card.

Referring to FIG. 1, a large number of data tracks Ta extending along an LF direction are formed on a data recording surface of an optical card C. These data tracks are illustrated in an enlarged manner by the alternate long and two short dashed lines in FIG. 2. A home position HP is defined on the data recording surface of the optical card C and serves as a reference position of access to the data tracks Ta. The data tracks Ta are arranged in an order of Ta1, Ta2, Ta3, ... from the side close to the home position HP. These data tracks consist of two types of tracks, i.e., tracks recorded with data and tracks not recorded with data. Data is recorded in each recorded track in the form of recording pits P. As shown in FIG. 2, tracking tracks Tb and the data tracks Ta are alternately formed on the data recording surface. Each tracking track Tb is used as a guide for auto-tracking (AT) so as to keep a light beam spot on a predetermined data track during scanning using the light beam spot in the data recording/reproduction mode.

In a conventional apparatus, however, the following drawback is presented during a track jump. Assume that a light beam spot is to cross the tracks shown in FIG. 2. When the light beam spot crosses a recording pit of a recorded track, a tracking error signal is undesirably generated. In this case, although the light beam spot has not reached a target track, the jump operation is interrupted halfway, and the operation mode is switched to a tracking servo mode. For this reason, an operation error occurs due to an influence of data already recorded on the conventional medium, and an accurate jump operation may not often be performed.

SUMMARY OF THE INVENTION

It is an object of the present invention to provide a method and apparatus for processing data, capable of solving the conventional problems described above, and accurately moving a light beam to a target track without being influenced by recorded data.

In order to achieve the above object according to an aspect of the present invention, there is provided a data processing apparatus for performing at least one of data recording on an optical recording medium and data reproduction from the optical recording medium, the optical recording medium having a plurality of data tracks and a plurality of tracking tracks, which are alternately formed to be parallel to each other, comprising:

means for radiating a first light beam for performing at least one of the data recording on one of the plurality of data tracks of the medium and data reproduction from the one of the plurality of data tracks, and for radiating a second light beam on one of the plurality of tracking tracks to detect a tracking error signal;

first moving means for moving the first and second light beams relative to the medium along a longitudinal direction of the data and tracking tracks;

second moving means for moving the first and second light beams relative to the medium in a direction perpendicular to the longitudinal direction of the data and tracking tracks;

means for detecting the tracking error signal from a beam obtained by reflection of the second light beam by the medium;

switching means for selectively supplying the tracking error signal to the second moving means;

means for supplying a moving signal to the second moving means to move the first and second light beams, respectively, to a data track different from the one data track and a tracking track different from the one tracking track; and control means for monitoring the tracking error signal, for switching the switching means to supply the tracking error signal to the second moving means in a tracking mode for controlling the apparatus to trace a data track with the first light beam, and for switching the switching means not to supply the tracking error signal to the second moving means in a moving mode for moving the first light beam to a different data track, the control means being arranged to interrupt monitoring of the tracking error signal during a period for which the second light beam is passing on data tracks in the moving mode.

There is also provided a method of driving the data processing apparatus having the above arrangement, comprising the steps of:

radiating the first light beam onto one data track of the medium and the second light beam onto one tracking track of the medium;

moving the first and second light beams relative to the medium along the longitudinal direction of the data and tracking tracks;

supplying the tracking error signal to the second moving means to control the apparatus to trace the one data track with the first light beam;

causing the control means to operate the switching means to inhibit supply of the tracking error signal to the second moving means;

supplying a moving signal from the supply means to the second moving means to move the first and second light beams, respectively, to a data track different from the one data track and a tracking track different from the one tracking track; and causing the control means to monitor the tracking error signal and operate the switching means to supply the tracking error signal to the second moving means again upon detection of a zero crossing point of the tracking error signal, the step of monitoring the tracking error signal being interrupted during a period for which the second light beam is passing on data tracks.

In order to achieve the above object according to another aspect of the present invention, there is provided a data processing apparatus for performing at least one of data recording on an optical recording medium and data reproduction from the optical recording medium, the optical recording medium having a plurality of data tracks and a plurality of tracking tracks, which are alternately formed to be parallel to each other, comprising:

a light source for emitting a first light beam for performing at least one of data recording and data reproduction, and second and third light beams for detecting a tracking error signal;

an objective lens for focusing the light beams emitted from the light source on the medium, the first light beam being radiated on one data track, the second light beam being radiated on a tracking track adjacent to one side of the one data track, and the third light beam being radiated on a tracking track adjacent to the other side of the one data track;

a motor for moving the first, second, and third beams relative to the medium along a longitudinal direction of the data and tracking tracks;

an actuator for driving the objective lens to move the first, second, and third light beams in a direction perpendicular to the longitudinal direction of the data and tracking tracks;

first and second photodetectors for receiving beams obtained by reflection of the second and third light beams by the medium, respectively;

a circuit for calculating the difference between outputs from the first and second photodetectors to detect a tracking error signal;

a switching circuit for selectively supplying the tracking error signal to the actuator;

a circuit for supplying a moving signal to the actuator to move the first, second, and third light beams to a data track different from the one data track and tracking tracks different from those adjacent to the one data track; and a control circuit for monitoring the tracking error signal, for switching the switching circuit to supply the tracking error signal to the actuator in a tracking mode for controlling the apparatus to trace a data track with the first light beam, and for switching the switching circuit not to supply the tracking error signal to the actuator in a moving mode for moving the first light beam to a different data track, the control circuit being arranged to interrupt monitoring of the tracking error signal during a period for which the second and third light beams are passing on data tracks in the moving mode.

DETAILED DESCRIPTION OF THE PREFERRED EMBODIMENT

A preferred embodiment of the present invention will be described in detail with reference to the accompanying drawings. The overall arrangement of an optical card recording/reproducing apparatus according to the present invention will be described with reference to FIG. 3.

Figure 3:
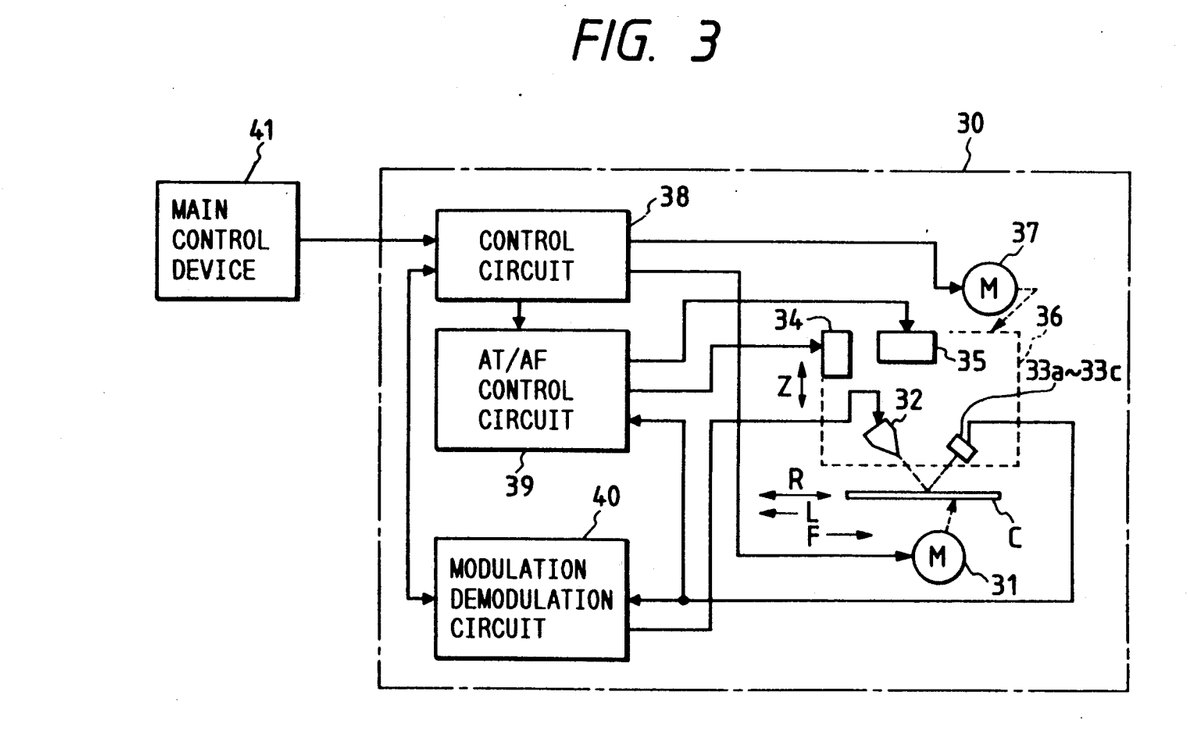
FIG. 3 is a block diagram showing a data processing apparatus according to an embodiment of the present invention.

Referring to FIG. 3, a recording/reproducing apparatus 30 uses an optical card C, as shown in FIG. 1. A main control device 41 is connected to the recording/reproducing apparatus 30. The recording/reproducing apparatus 30 includes an optical card convey mechanism (not shown) therein and conveys the optical card C inserted into a card slot to a predetermined position inside the apparatus. By this conveyance, the optical card C is set at the position illustrated in FIG. 3. During recording and reproduction, the optical card C can be reciprocated in directions R in this state. At the same time, a light beam spot is radiated from an optical system 32 onto the optical card C. In this embodiment, three light beam spots (to be described later) are formed on the optical card C during recording/reproduction, and beams obtained by reflection of these three light beam spots are received by photodetectors 33a to 33c, respectively. An auto-focusing (AF) actuator 34 drives some elements of the light beam radiation optical system 32 to move the focusing positions of the light beam spots on the surface of the optical card in directions Z, i.e., in directions perpendicular to the surface of the optical card, thereby performing an AF operation. An AT actuator 35 drives some elements of the optical system 32 to move the light beam spots on the surface of the optical card in directions Y (i.e., directions perpendicular to the directions R and Z), thereby performing an AT operation.

An optical head 36 is constituted by the optical system 32, the photodetectors 33a to 33c, the AF actuator 34, and the AT actuator 35. A drive motor 37 moves the optical head 36 as a whole in the directions Y to move each light beam spot in a range exceeding a movable range of the objective lens arranged in the optical head 36. For example, this motor 37 is used to move each light beam spot in the directions Y to access a desired track on the optical card. A drive motor 31 and the drive motor 37 are controlled by a control circuit 38.

Outputs from the photodetectors 33a to 33c are input to an AT/AF control circuit 39. This control circuit 39 controls the AF actuator 34 and the AT actuator 35 to perform AF and AT operations.

The outputs from the photodetectors 33a to 33c are also input to a modulation demodulation circuit 40 to demodulate the read data. A demodulated signal is supplied to the control circuit 38. The modulation demodulation circuit 40 also modulates a data signal sent from the control circuit 38 and drives the optical system 32 to perform data recording in accordance with the modulated signal. The control circuit 38 is controlled by the main control device 41 consisting of a CPU (Central Processing Unit) and exchanges data with the main control device 41.

Figure 4:
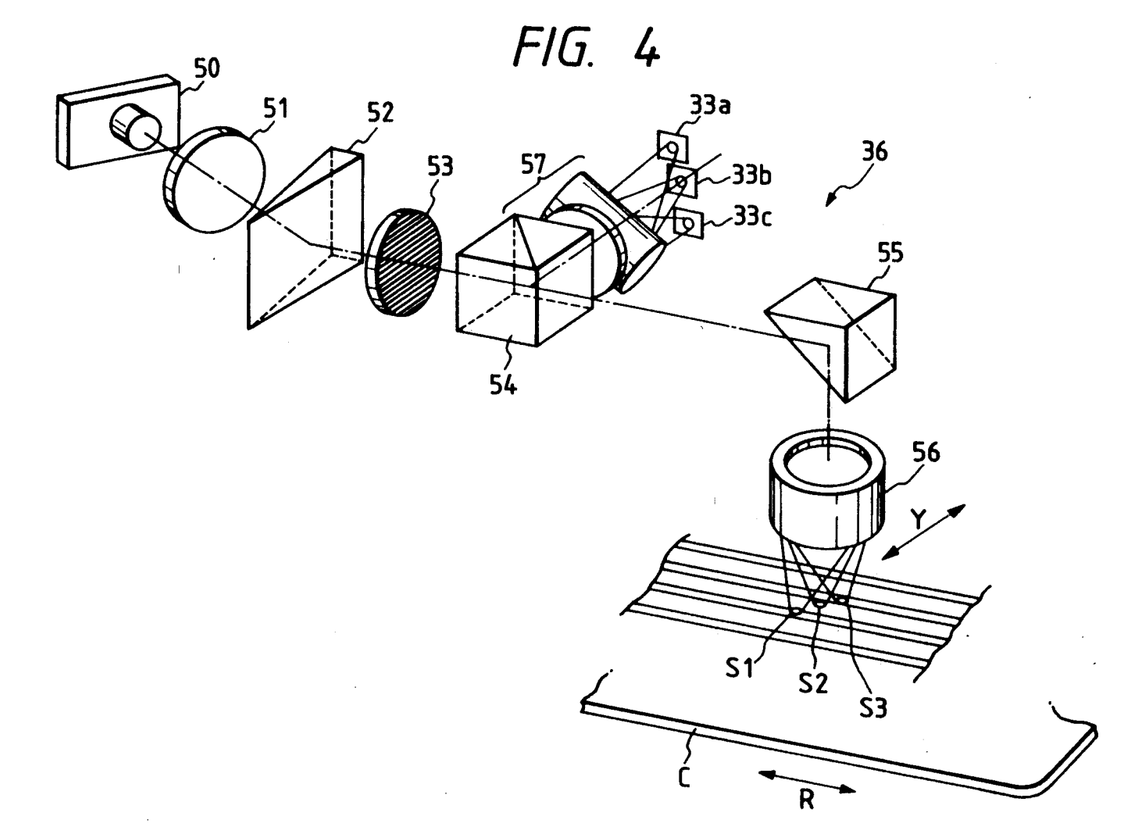
FIG. 4 is a perspective view showing a detailed arrangement of an optical head in the apparatus shown in FIG. 3.

A detailed arrangement of the optical head 36 will be described with reference to FIG. 4. Referring to FIG. 4, a light beam emitted from a semiconductor laser 50 serves as a divergent beam and is incident on a collimator lens 51. The divergent beam is collimated by the collimator lens 51. The collimated beam is shaped to have a predetermined intensity distribution by a light beam shaping prism 52. The shaped light beam is incident on a diffraction grating 53. The input light beam is split into three effective light beams (0th- and ±1st-order diffracted beams) by the diffraction grating 53. These three light beams are incident on a beam splitter 54 and are transmitted and propagate straight through the beam splitter 54. These beams are then reflected by a reflecting prism 55, and the reflected beams are incident on an objective lens 56. The beams are focused by the objective lens 56 to form small light beam spots S1 (corresponding to the +1st-order diffracted beam), S2 (corresponding to the 0th-order diffracted beam), and S3 (corresponding to the −1th-order diffracted beam).

The light beam spots S1 and S3 are located on adjacent tracking tracks, respectively, and the light beam spot S2 is located on a data track located between these adjacent tracking tracks. Beams obtained by reflection of the light beam spots formed on the optical card C are almost collimated through the objective lens 56. These beams are then reflected by the reflecting prism 55 and further reflected by the beam splitter 54. The reflected beams are focused by a focusing lens system 57 and are incident on the photodetectors 33a, 33b, and 33c, respectively. Detection signals output from the photodetectors 33a to 33c are input to the AT/AF control circuit 39 shown in FIG. 3. The control circuit 39 controls the AT actuator 35 and the AF actuator 34 on the basis of the input signals.

Figure 5:
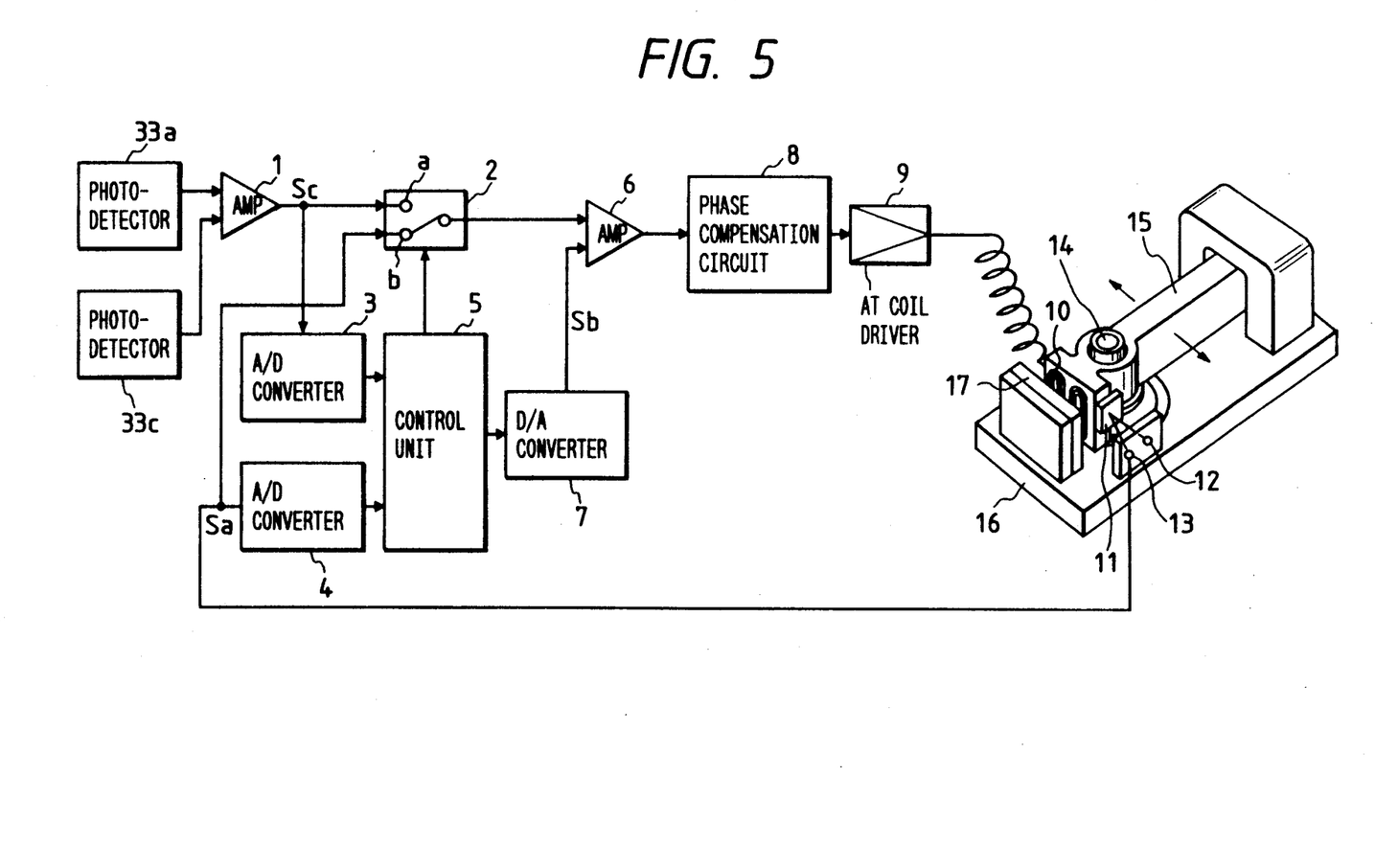
FIG. 5 is a view showing a detailed arrangement of an actuator and a control circuit in the apparatus of FIG. 3.

FIG. 5 is a block diagram showing a detailed circuit arrangement of the AT/AF control circuit 39.

The signals from the AT photodetectors 33a and 33c are input to an AT differential amplifier 1 to generate a tracking error signal Sc. This signal drives an AT coil 10 through a switch 2, an objective lens position control unit 6 comprising a differential amplifier, a phase compensation circuit 8, and an AT coil driver 9 to control an objective lens 14, thereby performing a tracking operation.

On the other hand, a light beam emitted from a light-emitting diode 12 is reflected by a reflecting surface 11 formed on an actuator support 15 integrally formed with the objective lens 14. The reflected beam is received by a phototransistor 13 to detect a signal Sa representing the position of the objective lens in the tracking direction. This signal Sa is input to an A/D (Analog/Digital) converter 4 and is converted into a digital value every appropriate sampling interval. The digital value is input to a control unit 5. The position signal Sa representing the position in the tracking direction is connected to the switch terminal b side of the switch 2. The tracking error signal Sc is converted into a digital value every appropriate sampling interval by an A/D converter 3. The obtained digital value is input to the control unit 5.

A value for performing position control of the objective lens 14 during a track jump is input from the control unit 5 to a D/A (Digital/Analog) converter 7. This signal is supplied to the objective lens position control unit 6 as a position control signal Sb.

Figure 6A:
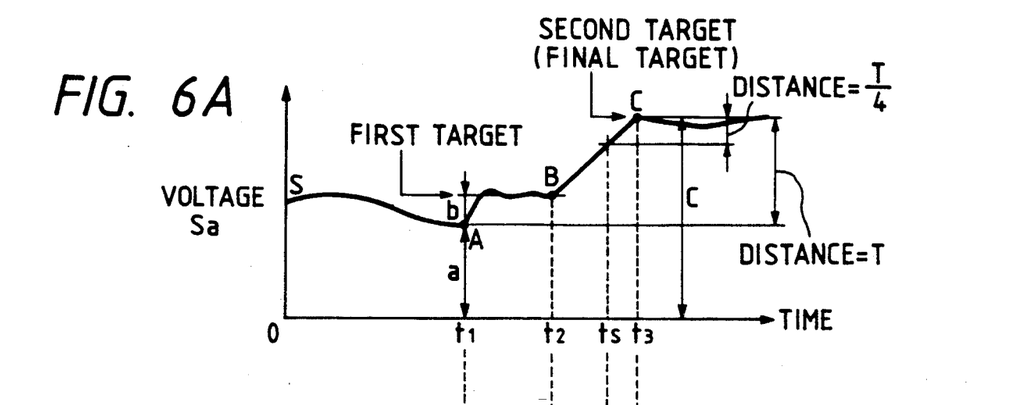
FIGS. 6A to 6C are timing charts showing signals in the circuit of FIG. 5.
Figure 6B:
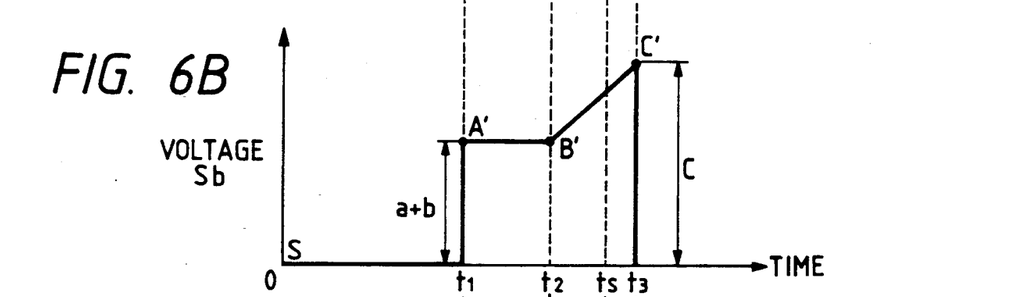
Figure 6C:
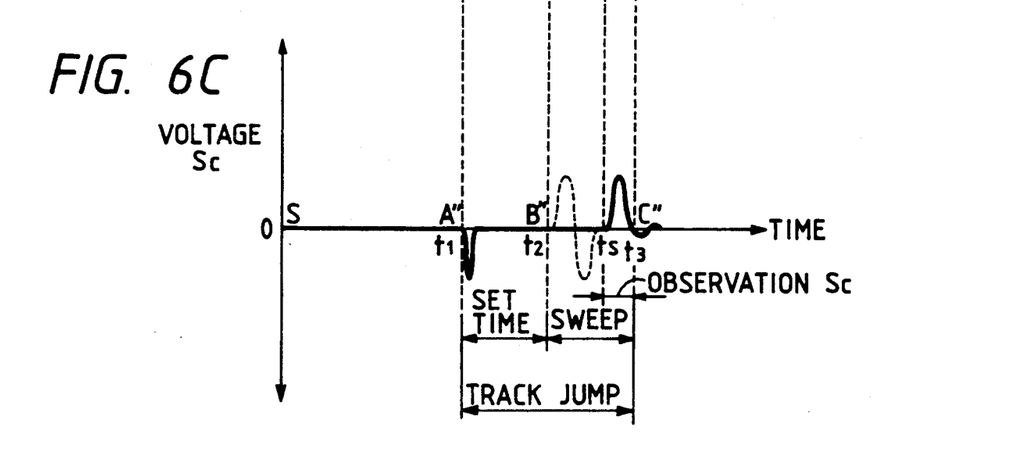

A track jump operation of the apparatus of this embodiment having the above arrangement will be described below. FIGS. 6A to 6C are timing charts for explaining the track jump operation. FIGS. 6A to 6C show changes in signals Sa, Sb, and Sc along the same time axis when a one-track jump operation is performed.

Assume that the switch 2 is kept connected to the a side for tracking to a given track on the recording medium in accordance with a command from the control unit 5. That is, tracking signals detected by the AT photodetectors 33a and 33c are input to the AT difference signal amplifier 1 and are output as a tracking error signal Sc. The tracking error signal Sc is input to one input terminal of the objective lens position control unit 6 through the switch 2 and drives the AT coil 10 through the phase compensation circuit 8 and the AT coil driver 9. In this state, i.e., in a state wherein the AT servo circuit is kept closed, the motion of the objective lens is controlled in accordance with the tracking error signal Sc, and the light beam spot S2 traces the data track. An offset voltage Sb=0 is input from the D/A converter 7 to the other input terminal of the objective lens position control unit 6. In this state, the objective lens position signal Sa representing the position of the objective lens 14 relative to an actuator 16 integrally formed with the optical head is changed from a point S to a point A, as shown in FIG. 6A, during a period between time 0 and time t1.

A track jump operation is performed at the point A. In this embodiment, the objective lens 14 is moved to a first target position B at high speed, and the objective lens 14 is then swept to a second target position C. In this case, the objective lens position signal Sa is input from the A/D converter 4 to the control unit 5. A value is supplied from the control unit 5 to the D/A converter 7 so that a voltage a+b as a sum of a voltage a of the objective lens position signal Sa at the detection time t1 (point A) and a voltage change b of the objective lens position signal Sa representing a moving distance of the objective lens 14 to the first target by a track jump is output from the D/A converter 7. As shown in FIG. 6B, the voltage a+b is input to the objective lens position control unit 6. At the same time, the switch 2 is operated to the b side in accordance with a command from the control unit 5. The servo loop is switched from the tracking servo loop to the objective lens position servo loop. The voltage Sb immediately becomes a+b at time t1 and is input to one input terminal of the objective lens position control unit 6. The objective lens position signal Sa is input to the other input terminal of the objective lens position control unit 6. For this reason, the difference between these input signals is amplified, and the amplified signal is input to the phase compensation circuit 8. The objective lens 14 is moved so as to reduce this difference. Finally, the objective lens 14 accurately reaches the point B as the first target. Note that the objective lens 14 exhibits movement as indicated by the points A and B in FIG. 6A due to the position servo transient response. The objective lens 14 is finally regulated and is located at the point B at time t2.

A value C of the objective lens position signal Sa corresponding to the final target position of the objective lens 14 is supplied to the objective lens position control unit 6 as the signal voltage Sb so that the objective lens 14 reaches the second target (final target) C. In this case, the value supplied from the control unit 5 to the D/A converter 7 is gradually changed and output to linearly increase (decrease) the signal voltage Sb. The objective lens position servo loop is formed on the basis of this signal voltage Sb. Since the signal voltage Sb is linearly and gradually changed, the objective lens position signal Sa also has a locus in which the level is gradually changed as in the signal voltage Sb.

Meanwhile, the tracking error signal Sc as an output from the AT difference signal amplifier 1 is kept input through the A/D converter 3. The control unit 5 starts observing or monitoring the tracking error signal Sc at time ts. The time ts is the time when the remaining distance to the target track becomes T/4 (where T is the track pitch). During the period of 3T/4 until time ts, the control unit 5 does not observe the tracking error signal Sc. At time t3, the objective lens 14 reaches the final target position C. Then, the tracking error signal Sc crosses the zero voltage, and the control unit 5 detects a zero crossing point. When this zero crossing point is detected, the switch 2 is operated to the a side again, thereby completing the jump operation.

Figure 7:
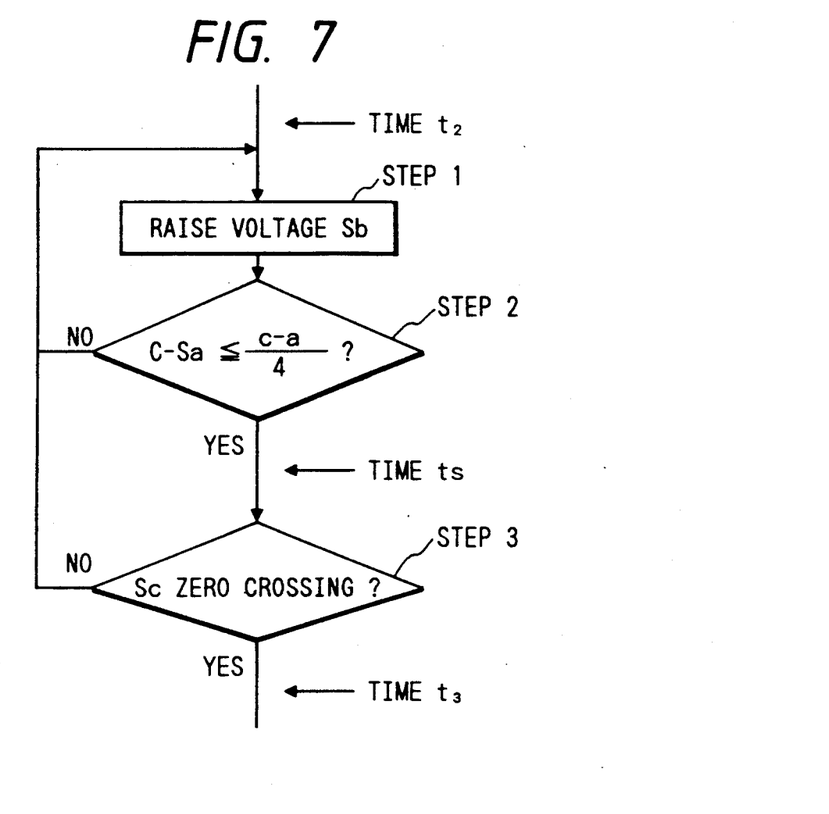
FIG. 7 is a flow chart for explaining a track jump operation according to a method of the present invention.

FIG. 7 is a flow chart showing an operation of the control unit 5 in the track jump mode. At time t2, the voltage Sb is linearly increased in step 1, thereby slightly moving the objective lens 14 toward the target track and hence moving the light beam spots in this direction. In step 2, the control unit 5 determines whether the following condition is satisfied, i.e., whether the remaining distance of each light beam spot to the target track is ¼ track:

$$C - Sa \leq (c-a)/4$$

The control unit 5 inhibits observation of the tracking error signal until the above condition is satisfied, i.e., until a period of 3T/4 elapses. If YES in step 2 and the remaining distance of the light beam spot to the target track reaches T/4 (time ts), the control unit 5 starts detecting the tracking error signal Sc. In step 3, the control unit 5 detects a zero crossing point of the tracking error signal Sc. When the zero crossing point is detected in step 3, the light beam spot reaches the target track, and the control unit 5 finishes the jump operation (time t3). The control unit 5 operates the switch 2 to the a side. At the same time, the control unit 5 supplies the offset voltage to the D/A converter 7 so that the offset voltage as the voltage Sb becomes a predetermined value (in this case, zero). Therefore, the servo loop is switched from the objective lens position servo loop to the original tracking servo loop.

Figure 8:
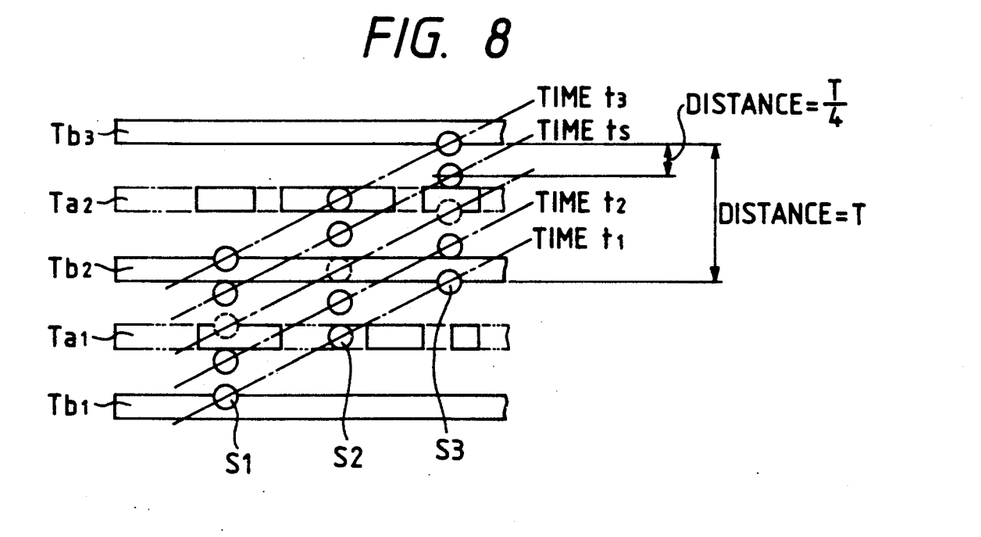
FIG. 8 is a plan view showing a state wherein light beam spots cross data and tracking tracks.

FIG. 8 shows states in which light beam spots cross the tracking and data tracks. Time t1 to time t3 and time ts in FIG. 8 correspond to those in FIGS. 6A to 6C and FIG. 7, respectively. As is apparent from FIG. 8, the track jump operation is started at time t1. The light beam spots S1 and S3 partially overlap tracking tracks Tb1 and Tb2, and the light beam spot S2 is located at the center of the data track. A jump operation is started from this state. At time t2, the light beam spot S3 reaches a position passing over the tracking track Tb1. The light beam spot S2 is located between the data track Ta1 and the tracking track Tb2. The light beam spot S1 reaches a position immediately before the data track Ta1. At time ts, the light beam spot S3 reaches a position passing over the data track Ta2. The light beam spot S2 is located between the tracking track Tb2 and the data track Ta2. The light beam spot S1 reaches a position immediately before the tracking track Tb2. When each beam spot is moved by 3T/4 after time ts, the light beam spots S1 and S3 have already passed over the data tracks. A pseudo tracking error signal is generated when the light beams pass over the recording pits of data tracks in this manner, as described above. FIG. 6C shows a tracking error signal output from the AT difference signal amplifier 1. The pseudo tracking error signal is generated between time t2 and time ts, as indicated by dotted lines.

In this embodiment, during the movement of each light beam spot in the period of 3T/4, since observation of the tracking error signal Sc by the control unit 5 is inhibited, tracking is not adversely affected even if the pseudo tracking error signal is generated during this period. That is, even if the pseudo tracking error signal is generated, the control unit 5 inhibits its detection. Therefore, a zero crossing point of the pseudo tracking error signal is not erroneously detected. Therefore, the problem of switching of the loop to the tracking servo loop halfway through the jump operation before each light beam spot reaches the target track can be prevented. Therefore, the jump operation can be accurately performed.

In a above embodiment, the one-track jump operation is exemplified. However, the present invention is also applicable to a jump operation of a plurality of tracks. In this case, when the number of tracks subjected to a jump operation is defined as N, a target voltage C' of the signal Sa shown in FIG. 6A is defined as follows:

$$C' = a + N(c-a)$$

The determination condition in step 2 of FIG. 7 can be given as follows:

$$C' - Sa \leq (c-a)/4$$

Observation of the tracking error signal is started when the distance to the target track becomes T/4 in the above embodiment. However, the distance is not limited to T/4. That is, detection of the tracking error signal is inhibited during at least a period in which light beam spots pass over data tracks, and is performed at a predetermined position at which an authentic tracking error signal is detected. In the above embodiment, the objective lens is moved to the first target, and then the objective lens is swept to the final target. However, the objective lens may be directly swept from the start point of a track jump to the target track.

The present invention is not limited to the particular embodiment described above, and various changes and modifications may be made within the spirit and scope of the invention. In the above embodiment, the optical card is used. However, the present invention is also applicable to an apparatus using a disk- or tape-like medium. The present invention incorporates all devices falling within the scope of the appended claims.

What is claimed is:

1. A data processing apparatus for performing at least one of data recording on an optical recording medium and data reproduction from the optical recording medium, the optical recording medium having a plurality of data tracks and a plurality of tracking tracks, which are alternately formed to be parallel to each other, comprising:

beam radiation means for radiating a first light beam for performing at least one of the data recording onto one of the plurality of data tracks of the medium and data reproduction from said one of the plurality of data tracks, and for radiating a second light beam onto one of the plurality of tracking tracks to detect a tracking error signal;

first moving means for moving the first and second light beams relative to the medium along a longitudinal direction of the data and tracking tracks;

second moving means for moving the first and second light beams relative to the medium in a direction perpendicular to the longitudinal direction of the data and tracking tracks;

means for detecting the tracking error signal from a beam obtained by reflection of the second light beam by the medium;

switching means for selectively supplying the tracking error signal to said second moving means;

means for supplying a moving signal to said second moving means to move the first and second light beams, respectively, to a data track different from said one data track and a tracking track different from said one tracking track; and control means for monitoring the tracking error signal, for switching said switching means to supply the tracking error signal to said second moving means in a tracking mode for controlling said apparatus to trace a data track with the first light beam, and for switching said switching means not to supply the tracking error signal to said second moving means in a moving mode for moving the first light beam to a different data track, said control means being arranged to interrupt monitoring of the tracking error signal during a period for which the second light beam is passing on data tracks in the moving mode.

2. An apparatus according to claim 1, wherein said control means operates said switching means so that the tracking error signal is input to said second moving means when a zero crossing point of the tracking error signal is detected in the moving mode.

3. An apparatus according to claim 1, wherein said beam radiation means comprises a light source for emitting the first and second light beams and a objective lens for focusing the light beams emitted from said light source onto the medium.

4. An apparatus according to claim 3, wherein said second moving means comprises an actuator for moving said objective lens in the direction perpendicular to the longitudinal direction of the data and tracking tracks.

5. An apparatus according to claim 4, further comprising an optical head having said objective lens and said actuator thereon, and detecting means for detecting a position signal representing a position of said objective lens relative to said optical head.

6. An apparatus according to claim 5, wherein the position signal is input to said second moving means through said switching means in the moving mode.

7. An apparatus according to claim 1, wherein the medium comprises a card-like optical recording medium, and said first moving means comprises a motor for reciprocating the medium along the longitudinal direction of the data and tracking tracks.

8. A data processing apparatus for performing at least one of data recording on an optical recording medium and data reproduction from the optical recording medium, the optical recording medium having a plurality of data tracks and a plurality of tracking tracks, which are alternately formed to be parallel to each other, comprising:

a light source for emitting a first light beam for performing at least one of data recording and data reproduction, and second and third light beams for detecting a tracking error signal;

an objective lens for focusing the light beams emitted from said light source on the medium, the first light beam being radiated onto one data track, the second light beam being radiated onto a tracking track adjacent to one side of said one data track, and the third light beam being radiated onto a tracking track adjacent to the other side of said one data track;

a motor for moving the first, second, and third beams relative to the medium along a longitudinal direction of the data and tracking tracks;

an actuator for driving said objective lens to move the first, second, and third light beams in a direction perpendicular to the longitudinal direction of the data and tracking tracks;

first and second photodetectors for receiving beams obtained by reflection of the second and third light beams by the medium, respectively;

a circuit for calculating the difference between outputs from said first and second photodetectors to detect a tracking error signal;

a switching circuit for selectively supplying the tracking error signal to said actuator;

a circuit for supplying a moving signal to said actuator to move the first, second, and third light beams to a data track different from said one data track and tracking tracks different from those adjacent to said one data track; and a control circuit for monitoring the tracking error signal, for switching said switching circuit to supply the tracking error signal to said actuator in a tracking mode for controlling said apparatus to trace a data track with the first light beam, and for switching said switching circuit not to supply the tracking error signal to said actuator in a moving mode for moving the first light beam to a different data track, the control circuit being arranged to interrupt monitoring of the tracking error signal during a period for which the second and third light beams are passing on data tracks in the moving mode.

9. An apparatus according to claim 8, wherein said control circuit operates said switching circuit so that the tracking error signal is input to said actuator when a zero crossing point of the tracking error signal is detected in the moving mode.

10. An apparatus according to claim 8, further comprising an optical head having said objective lens and said actuator thereon, and a position detection circuit for detecting a position signal representing a position of said objective lens relative t said optical head.

11. An apparatus according to claim 10, wherein the position signal is input to said actuator through said switching circuit in the moving mode.

12. A method of driving a data processing apparatus comprising beam radiation means for radiating first and second light beams onto an optical recording medium having a plurality of data tracks and a plurality of tracking tracks, which are alternately formed to be parallel to each other, first moving means for moving the first and second light beams relative to the medium along a longitudinal direction of the data and tracking tracks, second moving means for moving the first and second light beams relative to the medium in a direction perpendicular to the longitudinal direction of the data and tracking tracks, means for detecting a tracking error signal from a beam obtained by reflection of the second light beam by the medium, switching means for selectively supplying the tracking error signal to the second moving means, means for supplying a moving signal to the second moving means to move the first and second light beams, respectively, to a data track different from one data track and a tracking track different from one tracking track, and control means for monitoring the tracking error signal to operate the switching means, comprising the steps of:

radiating the first light beam onto one data track of the medium and the second light beam onto one tracking track of the medium;

moving the first and second light beams relative to the medium along the longitudinal direction of the data and tracking tracks;

supplying the tracking error signal to the second moving means to control the apparatus to trace the one data track with the first light beam;

causing the control means to operate the switching means to inhibit supply of the tracking error signal to the second moving means;

supplying a moving signal from the supplying means to the second moving means to move the first and second light beams, respectively, to a data track different from the one data track and a tracking track different from the one tracking track; and causing the control means to monitor the tracking error signal and operate the switching means to supply the tracking error signal to the second moving means again upon detection of a zero crossing point of the tracking error signal, said step of monitoring the tracking error signal being interrupted during a period for which the second light beam is passing on data tracks.

* * * * *

UNITED STATES PATENT AND TRADEMARK OFFICE
CERTIFICATE OF CORRECTION

PATENT NO. : 5,199,016

DATED : March 30, 1993

INVENTOR(S) : SATOSHI SHIKICHI

It is certified that error appears in the above-indentified patent and that said Letters Patent is hereby corrected as shown below:

[57] ABSTRACT
Line 5, "trucking tracks" should read --tracking tracks--.

COLUMN 5
Line 41, "-1th-order" should read -- -1st-order--.

COLUMN 8
Line 45, "a" should read --an--.

COLUMN 9
Line 1, "start" should read --starting--.

COLUMN 11
Line 10, "relative t" should read --relative to--.

Signed and Sealed this

Eighth Day of February, 1994

Attest:

BRUCE LEHMAN

Attesting Officer

Commissioner of Patents and Trademarks